(12) United States Patent
Brunel et al.

(10) Patent No.: US 7,684,461 B2
(45) Date of Patent: Mar. 23, 2010

(54) MULTIMODE RECEIVER

(75) Inventors: Dominique Brunel, Caen (FR); Laurent Noel, Antibes (FR)

(73) Assignee: ST-Ericsson SA, Geneva (CH)

( * ) Notice: Subject to any disclaimer, the term of this patent is extended or adjusted under 35 U.S.C. 154(b) by 1301 days.

(21) Appl. No.: 10/540,792

(22) PCT Filed: Dec. 11, 2003

(86) PCT No.: PCT/IB03/06038

§ 371 (c)(1),
(2), (4) Date: Jun. 27, 2005

(87) PCT Pub. No.: WO2004/059861

PCT Pub. Date: Jul. 15, 2004

(65) Prior Publication Data

US 2006/0245474 A1    Nov. 2, 2006

(30) Foreign Application Priority Data

Dec. 30, 2002   (EP)   .................... 02293259

(51) Int. Cl.
    *H04L 27/30* (2006.01)
(52) U.S. Cl. ................. 375/130; 375/140; 375/147; 375/343; 370/320; 370/342; 370/441; 370/465; 455/133; 455/160.1; 455/168.1; 455/277.1
(58) Field of Classification Search ................ 375/130, 375/131, 136, 140, 141, 147, 316, 340, 343; 455/133, 142, 144, 160.1, 161.1, 167.1, 168.1, 455/277, 277.1; 370/320, 321, 342, 441, 370/465, 466
See application file for complete search history.

(56) References Cited

U.S. PATENT DOCUMENTS

| 5,794,159 A | * | 8/1998 | Portin ................ 455/553.1 |
| 6,292,474 B1 | * | 9/2001 | Ali et al. ................ 370/328 |
| 6,332,083 B1 | * | 12/2001 | Shi et al. ............... 455/552.1 |
| 6,529,545 B2 | * | 3/2003 | Tiirola et al. ............ 375/148 |

(Continued)

FOREIGN PATENT DOCUMENTS

| JP | 2002325049 A | 11/2002 |
| JP | 2002374177 A | 12/2002 |

OTHER PUBLICATIONS

Cranford, FR. et al. (US 2004/0114670); Jun. 7, 2004; System And Method For Transmitting Data And Additional Information Simultaneously Within A Wire Based Communication System.*

*Primary Examiner*—Dac V Ha
(74) *Attorney, Agent, or Firm*—William J. Kubida; Peter J. Meza; Hogan & Hartson LLP (57) ABSTRACT

The present invention relates to a receiver for processing a received signal (SEQ), said receiver being multimode. The invention is characterized in that it comprises; a) a single RF chip for processing the received signal (SEQ) in any mode, said chip comprising a spreading section (SPREAD SEC) for spreading and downconverting to baseband a received signal (SEQ), and a channel filtering section (CH SEC) for DC offsets rejection on a received signal (SEQ), and b) a single baseband chip (BB) comprising despreading means (DSPR) for despreading a spread signal (SEQ).

19 Claims, 7 Drawing Sheets

U.S. PATENT DOCUMENTS

| | | | |
|---|---|---|---|
| 6,735,426 B1 * | 5/2004 | Pau | 455/255 |
| 6,791,995 B1 * | 9/2004 | Azenkot et al. | 370/436 |
| 6,804,497 B2 * | 10/2004 | Kerth et al. | 455/88 |
| 6,952,594 B2 * | 10/2005 | Hendin | 455/552.1 |
| 6,970,717 B2 * | 11/2005 | Behrens et al. | 455/553.1 |
| 7,058,380 B2 * | 6/2006 | Sato | 455/260 |
| 7,106,805 B2 * | 9/2006 | Atkinson et al. | 375/295 |
| 7,158,574 B2 * | 1/2007 | Vishakhadatta et al. | 375/259 |
| 7,209,494 B1 * | 4/2007 | Griffin et al. | 370/516 |
| 7,327,775 B1 * | 2/2008 | Gu | 375/130 |
| 7,447,519 B2 * | 11/2008 | Axness et al. | 455/552.1 |
| 2002/0136275 A1 | 9/2002 | Wight | |

* cited by examiner

MULTIMODE RECEIVER

FIELD OF THE INVENTION

The present invention relates to a receiver for processing a received signal, said receiver being multimode. The invention further relates to an associated method for receiving a signal in any mode.

Such a receiver may be used in particular in any multimode terminals such as a mobile phone using multimode standards like GSM and W-CDMA (UMTS).

BACKGROUND OF THE INVENTION

A multimode terminal comprises a receiver, which permits to manage the received signal, whatever the standard of this signal is.

Today, from an RF point of view, the emerging multimode receivers in a terminal are implemented by using as many RF chipsets as there are targeted standards by the terminal. The latest triple band mobile phone GSM/DCS/PCS, which also includes bluetooth standard and FM radio reception, is implemented with three separate chipsets, one for each standard as described in the RFMD UMTS/DCS/GSM chipset document for their RF51176 receiver, for example.

In this kind of architecture, one can understand that the more standards the terminal manages, the more the number of chipsets increases leading to an increase of power consumption, of components and so to great cost, and to a complex architecture.

SUMMARY OF THE INVENTION

Accordingly, it is an object of the invention to provide a receiver and a method for receiving a signal, which overcome the disadvantages of the prior art.

To this end, according to a first object of the invention, the receiver comprises:
- a single RF chip for processing the received signal in any mode, said chip comprising a spreading section for spreading and downconverting to baseband a received signal and a channel filtering section for DC offsets rejection on a received signal, and
- a single baseband chip comprising despreading means for despreading a spread signal.

In addition, according to a second object of the invention, the method for receiving a signal comprises the steps of:
- spreading and down-converting the received signal to baseband,
- rejecting the DC offsets on the received signal, and
- despreading the spread signal.

As we will see in detail further on, such a receiver makes it possible to have only one chip, i.e., one reception chain for all the standards used for transmission, such as GSM or W-CDMA also called UMTS thanks to the spreading of the received signal.

In a preferred non-limitative embodiment of the invention, the receiver is characterized in that the spreading section is adapted to produce a spread spectrum oscillator and a spreading sequence, in order to expand the bandwidth of a received signal.

In a preferred non-limitative embodiment of the invention, the receiver is characterized in that the spreading section further comprises unique rejection means for all the modes for suppressing the adjacent carrier frequencies of the associated received signals.

In a preferred non-limitative embodiment of the invention, the receiver is characterized in that the channel filtering section is common for all the modes.

In a preferred non-limitative embodiment of the invention, the receiver is characterized in that the channel filtering section comprises:
- a block of low-noise amplifier and associated mixers for each mode, and
- unique first rejection means for rejecting DC offsets on a spread received signal for any mode.

In a preferred non-limitative embodiment of the invention, the receiver is characterized in that the channel filtering section further comprises adding means for redirecting a spread received signal coming from a block of low-noise amplifier and associated mixers to the first rejection means.

In a preferred non-limitative embodiment of the invention, the receiver is characterized in that the baseband chip further comprises:
- channel filter coefficient banks with associated filters for each mode for rejecting adjacent carrier frequencies on the associated spread received signal, and
- a matching filter for producing the same distortion of a spread signal on a corresponding despreading sequence.

In a preferred non-limitative embodiment of the invention, the receiver is characterized in that the despreading means comprise:
- a single multiplier, and
- a single correlator with integration and dump means.

In a preferred non-limitative embodiment of the invention, the receiver is characterized in that the baseband chip further comprises synchronization means for synchronizing a spread signal with a corresponding despreading sequence.

In a preferred non-limitative embodiment of the invention, the method is characterized in that it comprises also a step of producing a spread spectrum oscillator and a spreading sequence in order to expand the bandwidth of the received signal.

BRIEF DESCRIPTION OF THE DRAWINGS

Additional objects, features and advantages of the invention will become apparent upon reading the following detailed description and upon reference to the accompanying drawings in which.

Corresponding reference numerals will be used for corresponding elements throughout the description.

DETAILED DESCRIPTION OF THE INVENTION

In the following description, well-known functions or constructions by a person skilled in the art are not described in detail since they would obscure the invention in unnecessary detail.

The present invention relates to a receiver REC for processing a received signal.

Said receiver REC is used in particular in communication systems and more particularly in a user equipment such as a mobile phone. The receiver comprises a reception chain RX_CHAIN allowing multimode reception, i.e. reception of signals coming from a UMTS base station or a GSM base station for example, and in particular in compressed mode operation. In a compressed mode operation, the receiver does not have to "listen" (i.e. synchronize, demodulate and downconvert) simultaneously to two different signals of two different modes GSM and UMTS for example.

Figure 1:
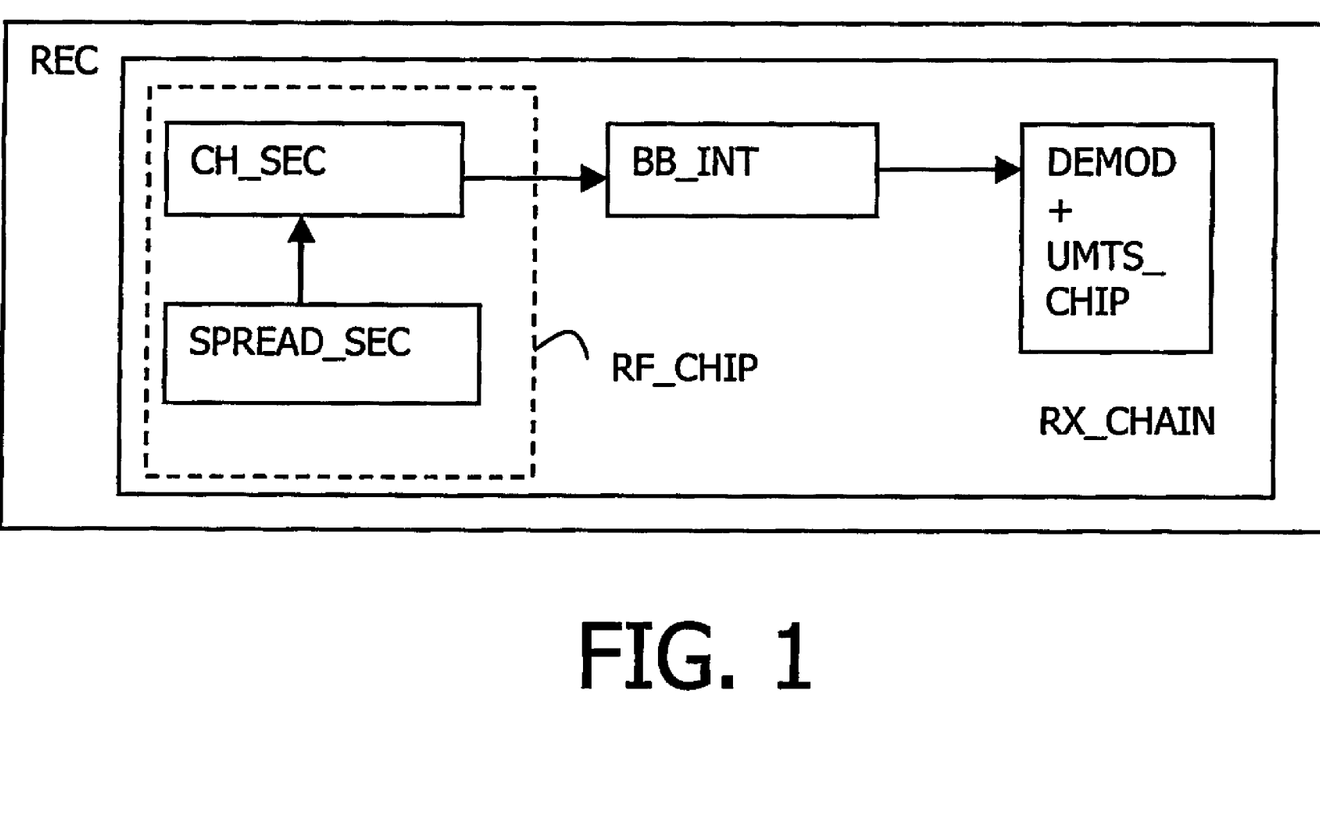
FIG. 1 is a rough diagram of the receiver according to the invention.

Such a receiver REC is illustrated in FIG. 1.

The receiver REC comprises:
a single RF chip for processing a received signal SEQ in any mode, said chip comprising a spreading section SPREAD_SEC for spreading the received signal SEQ and a channel filtering section CH_SEC for DC offset rejection on the received signal SEQ, and
a single baseband chip BB_INT.

Figure 2:
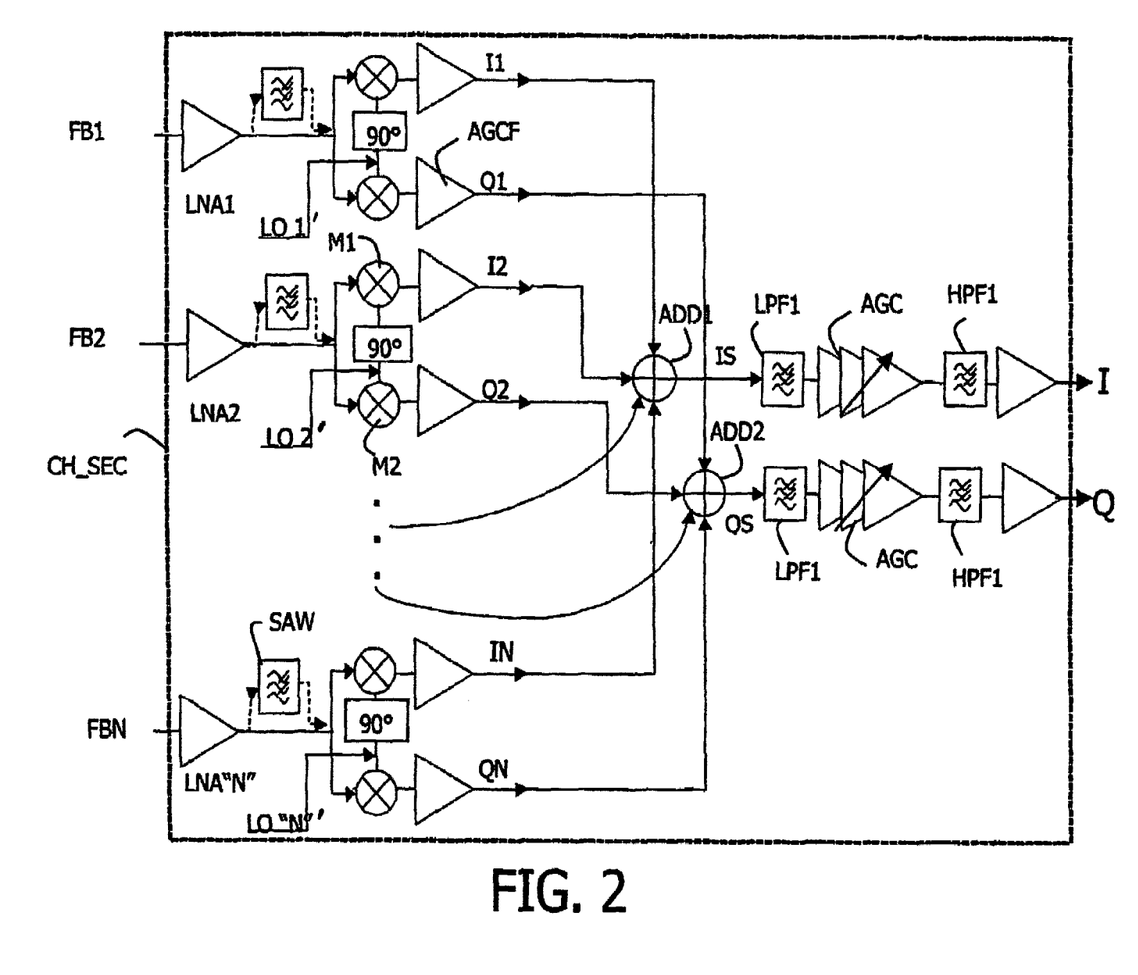
FIG. 2 illustrates an architecture of the channel filtering section of the receiver of FIG. 1.

The channel filtering section CH_SEC is illustrated in FIG. 2.

It comprises:
As many blocks of low-noise amplifiers LNA and associated mixers M1&M2 as there are standards targeted,
First rejection means HPF1 for rejecting DC offset on a spread signal, said first rejection means being a high-pass filter and being unique for all the standards targeted, and
A unique gain controller amplifier AGC for all the standards targeted.

The channel filtering section CH_SEC further comprises an adder ADD for adding all received signals SEQ from the amplifier-mixer blocks and output a result directed on the first rejection means HPF1.

Figure 3:
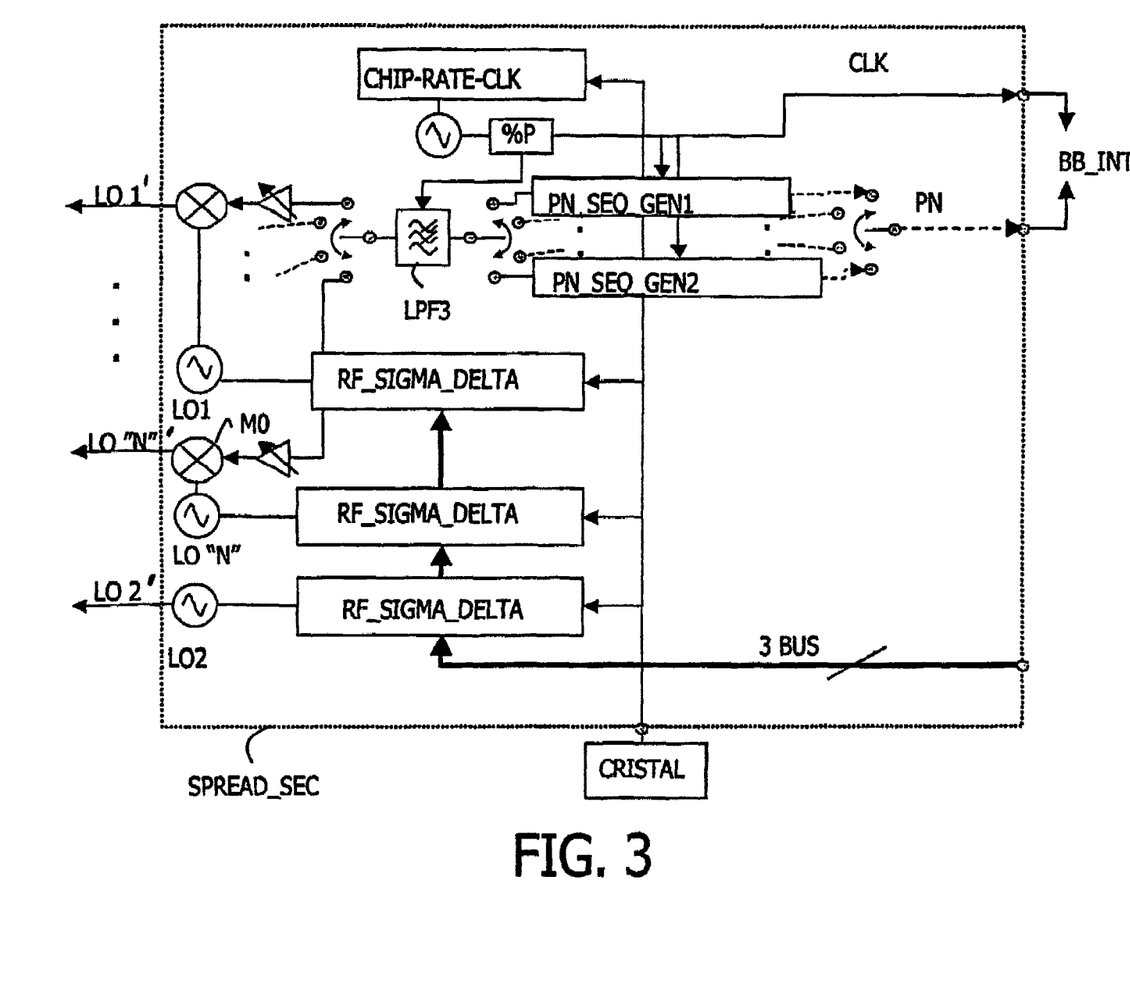
FIG. 3 illustrates an architecture of the sequence generator section of the receiver of FIG. 1.

The spreading section SPREAD_SEC is illustrated in FIG. 3.

It comprises:
A sequence generator PN_SEQGEN for providing a spread sequence PN associated with each targeted mode of the received signal except for the mode UMTS mode,
A local oscillator LO associated to each targeted mode, which spread spectrum is used together with the PN sequence to spread the bandwidth of the received signal SEQ,
A RF sigma delta synthesizer RF_SIGMA_DELTA associated to each targeted mode, said synthesizer being used to master a voltage controller producing the local oscillator LO of each mode,
A chip rate clock CHIP_RATE_CLK,
A crystal CRISTAL,
3 wire bus BUS for programming the synthesizers RF_SIGMA_DELTA,
A series of multiplexers for directing the right spreading sequences PN on the channel section CH_SEC and/or baseband chip BB_INT.

The spreading section SPREAD_SEC further comprises further rejection means LPF3 for suppressing the adjacent carrier frequencies of a received signal SEQ, said further means being a low-pass filter.

Figure 4:
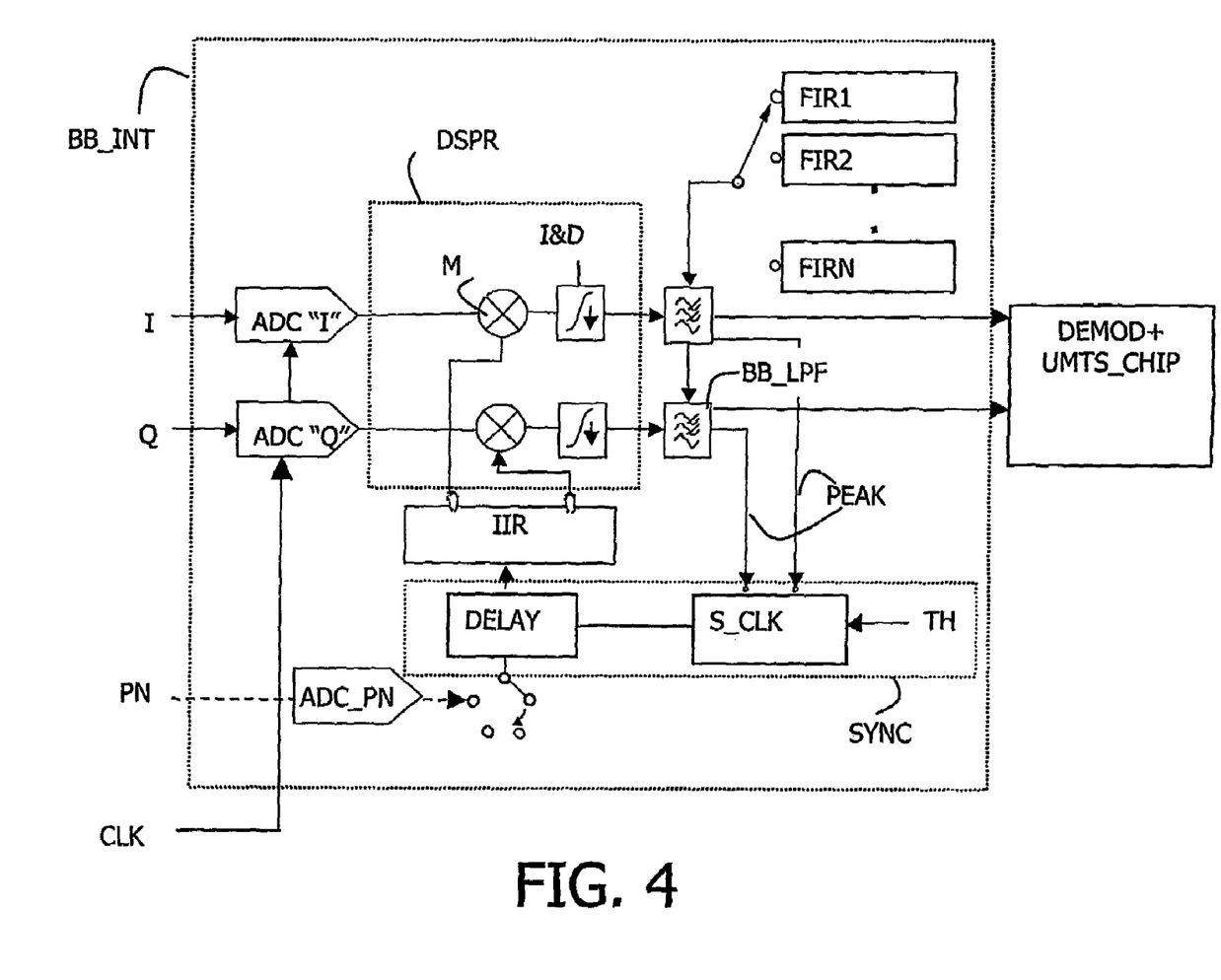
FIG. 4 illustrates an architecture of the baseband interface of the receiver of FIG. 1.

The baseband chip BB is illustrated in FIG. 4.

It comprises:
A unique analog to digital converter ADC,
Despreading means DSPR for despreading a spread signal in any targeted mode except for the UMTS mode,
A channel filter coefficient bank FIR with associated filter BB_LPF, associated to each targeted mode for rejecting adjacent carrier frequencies, and
A series of multiplexers for selecting the right despreading sequence PN to be directed on to a delay line DELAY and for selecting the right channel filter coefficient bank FIR.

The despreading means DSPR comprise:
a unique digital multiplier M,
A correlator with a unique integrate-and-dump means I&D.

The baseband chip BB_INT further comprises:
Synchronization means SYNC comprising a delay line DELAY producing a sliding clock S_CLK, and a threshold TH, and
A PN sequence matching digital filter IR.

In the following description, a GSM signal, a UMTS signal and a Bluetooth signal will be taken as examples.

When receiving a signal SEQ from a base station via the antenna of the User Equipment, i.e. the mobile phone, said signal is received at a certain radio carrier frequency, and with a 3 dB bandwidth of 270 kHz for the GSM standard, or with a 3 dB bandwidth of around 5 MHz for the UMTS standard. The signal SEQ is first processed in the mobile phone via the receiver REC. More particularly, in said receiver REC, there is a need to translate this radio frequency to the baseband frequency (0 Hz) in order to be able to demodulate the signal so that it can be treated by some other components of the mobile phone further on, such as the loudspeakers.

Figure 5:
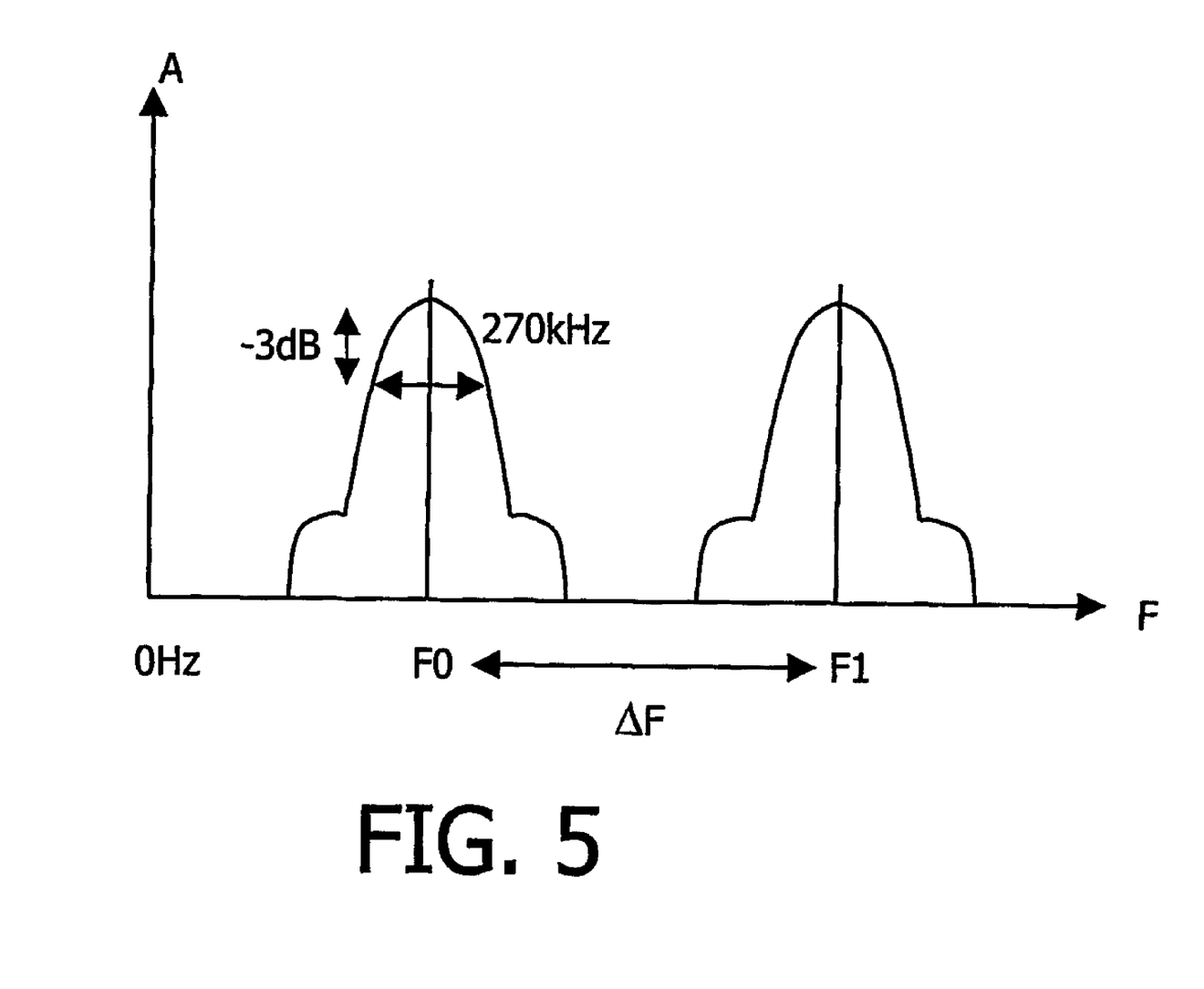
FIG. 5 illustrates a sketch of a GSM like signal received by the receiver of FIG. 1 and one adjacent carrier.

A GSM signal is illustrated in FIG. 5 in the frequency domain. Said signal SEQ is centered on the GSM carrier center frequency of F0. There are often some adjacent carrier frequencies, which can degrade the reception of the desired GSM carrier frequency. The center frequency F1 of such an adjacent carrier frequency is also illustrated. The difference $\Delta F$ between the 2 centers P0 and F1 is within the GSM frequency band (900 MHz band for example).

The receiver REC processes a received signal SEQ as follows.

As described above, the receiver REC is multimode. Following the proposed example illustrated in FIG. 2, the first block LNA1-mixers M1&M2 is designated to match the GSM frequency band requirements, i.e. FB1=900 MHz, while the second block LNA2-mixersM1&M2 is tuned to match the UMTS (FDD-WCDMA) frequency band, i.e. FB2=2110-2170 MHz, and so on until the Nth block LNA N-mixer. Said amplifier LNA allows a decrease of the noise of the corresponding received signal SEQ within the receiver REC.

In a first step 1), if the received signal SEQ is not already spread, for example a GSM or Bluetooth received signal, spreading of the carrier frequency spectrum of said received signal SEQ with a corresponding spreading sequence PN is achieved by the spreading section SPREAD_SEC and the channel filtering section CH_SEC. This spreading consists in expanding the bandwidth of the carrier frequency of the signal SEQ by multiplying the data bits of said signal SEQ by a spread spectrum LO. Spreading a continuous-wave local oscillator LO via an analog multiplier M0 with the corresponding spreading sequence PN as shown in FIG. 3 generates the associated spread-spectrum local oscillator LO. The spectrum of a PN sequence is infinite and has a cut-off frequency of 3,84 MHz for the GSM standard and of 1 MHz for the Bluetooth standard.

It may be observed that the local oscillator are spread only in the case of receiving narrowband carriers.

Therefore, the reception of a 2-wideband CDMA carrier i.e. a UMTS received signal is simpler since the carrier is already a spread spectrum signal. No spreading is achieved for such a signal as can be seen in FIG. 3 and the local oscillator LO2 is a simple sine wave, as used in a conventional RF receiver chain (no multiplier M0 is associated to the local oscillator LO2).

Note that a sequence generator PN_SEQGEN generates the corresponding spreading sequence PN at a frequency FN of 3.84 MChip/sec via a clock CHIP-RATE-CLK for any modes except the UMTS one. Said clock permits to have an integer multiple of the desired frequency FN.

But, for the sake of a demodulation process later on, said sequence generators PN_SEQ_GEN oversample its output signal to 4, which has the effect of having a frequency of 15.36 MHz.

Depending of the received signal SEQ, the series of multiplexers in the spreading means SPREAD_SEC direct the right spreading sequence PN on the channel section CH_SEC and on the baseband chip BB_INT. A spreading sequence PN can be a Gold or Kasami code family well known to those skilled in the art or any other type, such as Walsh codes. Advantageously, the different spreading sequences PN associated to the different received signals of the different targeted modes are orthogonal.

It may be observed that usually, when there is a spreading of the received signal SEQ as described above, there is also a spreading of the far adjacent carrier frequencies, for example it is the case for the GSM standard, which total operate frequency is 900 MHz.

In this case, the energy of such adjacent signals is important and can hamper the despreading process described in the description later on. Therefore, it is necessary to get rid of these far adjacent signals.

Figure 6:
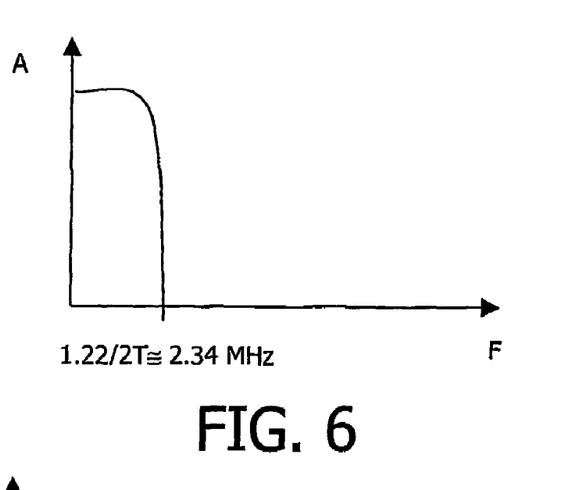
FIG. 6 illustrates the spectrum of a spreading sequence after further rejection means of the receiver of FIG. 1.

To this end, in a preferred embodiment as shown in FIG. 3, the radio frequency RF chip comprises further rejection means LPF3 which are a low pass filter with a roll-off factor α of 0.22, which is set at the output of the set of the sequence generator PN_SEQ_GEN. This filter LPF3 permits to suppress the adjacent carrier frequencies of a received signal SEQ, and especially those, which are far from the wanted carrier frequency F0. Such received signal SEQ is then now exhibiting a root raised cosine RRC spectral occupancy of 3 dB bandwidth equal to 2.3 MHz as shown in FIG. 6 for any mode except for the UMTS one. The occupied bandwidth is identical to that of a FDD-WCDMA carrier (UMTS signal).

Figure 7:
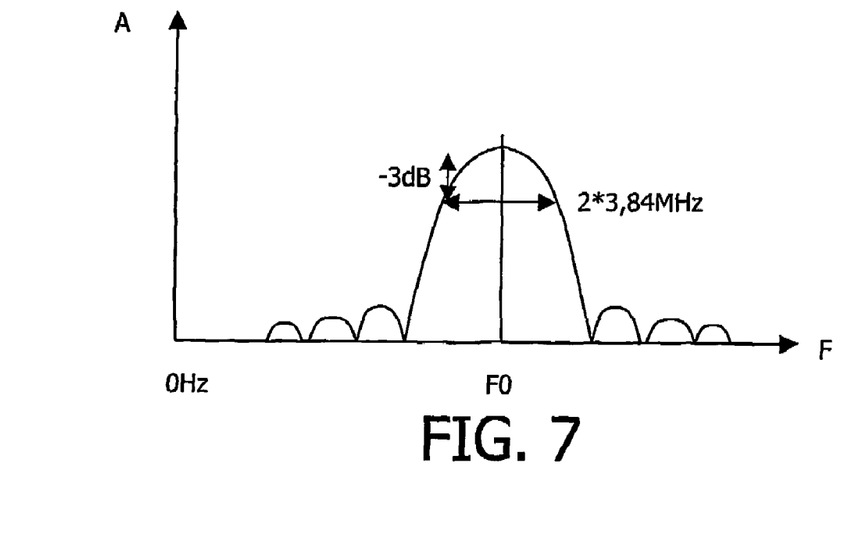
FIG. 7 illustrates the spectrum of the spread spectrum local oscillator centered at a frequency F0 of the receiver of FIG. 1.

One can see in FIG. 7 the spectrum of the LO1-LON (except the LO2) at multipliers M0 output, when further rejection means LPF3 described before are configured as all-pass filters. In other words, the spreading sequences PN injected into the multipliers M0 are a square waveform. The spectrum is centered on the frequency F0, the same frequency as the one of the corresponding received signal SEQ. One may now understand that by multiplying a received signal SEQ centered to F0 by the spectrum local oscillator LO1-LON centered to F0, one obtains an output signal SEQ centered to FCB=F0−F0=0 Hz and to FCH=F0+F0. The second frequency FCH is about 4 GHz and will be filtered later on via the amplifiers and low-pass filters of the RF chip as those components does not accept frequencies higher than 10 MHz in general.

Hence, at the output of the corresponding quadrature mixers M1 and M2 of FIG. 2, the spread signal SEQ of any mode occupies the bandwidth of the spreading sequence PN of 3.84 Mchip/s in the frequency domain.

Figure 8:
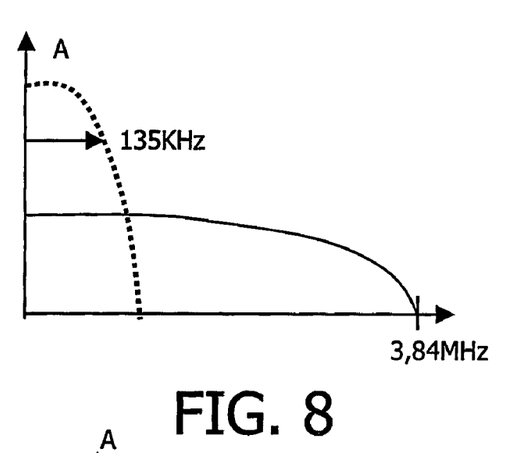
FIG. 8 illustrates an initial received signal and the spectrum of the signal output by the spreading means of the receiver of FIG. 1 after downconversion.

A spread GSM signal can be seen on the FIG. 8. In a dotted line, one can see an example of the spectrum of the initial received signal SEQ. In the GSM example, the signal SEQ is now exhibiting a spectral occupancy of a typical square wave signal clocked at 3.84 MHz, i.e. sin(x)/x amplitude envelope, with zero crossing at N*3.84 MHz, N being an integer. Thus, the main carrier frequency F0 has been down-converted to baseband, i.e. centered around 0 Hz.

Hence, at mixers M1 & M2, one performs simultaneous spreading of the received signal SEQ via the multiplication by the PN spreading sequence, except for a UMTS signal, and a down-conversion for all the modes to baseband via the multiplication of a spread-spectrum local oscillator LO or a normal-spectrum local oscillator LO2 for the UMTS mode.

Note that there is an external crystal CRISTAL of 26 Mhz, which is used as a clock reference for the sigma delta synthesizer RF_SIGMA_DELTA, said synthesizers being used to phase-lock a voltage controller VCO producing the cosine wave local oscillators LO1 to LON, and said synthesizers being programmed by the three-wire bus BUS. The chip rate clock CHIP_RATE_CLK is also phase-locked to the external crystal, therefore ensuring phase coherence of the entire circuit IC. This chip rate clock produces a clock CLK running at 4*chip rate. This clock is then fed to the baseband chip BB_INT where it will be used by the analog-to-digital converters ADC to sample the incoming waveforms I&Q, and to clock all other digital blocks as will be described later on in the description.

Note also that the received signal SEQ is split into 2 components I and Q, well known to the person skilled in the art, via the two quadrature mixers M1 and M2, and that all the following steps are done on the 2 components in parallel. But for the sake of simplification, the term signal SEQ will be used instead of I and Q components.

Note that in a non-limited embodiment, one can add an optional RF SAW filter to each set of LNA-mixers M1-M2 if said LNA-mixers are not linear, i.e. the LNA-mixers produce also some DC-offsets because of some parasite signal. This SAW filter cannot be integrated in the RF chip.

However, although a received signal SEQ has been down-converted to baseband and spread, there are still some DC offsets. Therefore, DC rejection is performed as follows.

It can be noted that after down-conversion, the rest of the receiver chain RX_CHAIN is common for all the telecom standards since any carrier now occupies the same bandwidth, i.e. 3.84 Mchip/sec. In this way, the receiver according to the invention saves costs and complexity by ensuring only one channel filtering section CH_SEC is reused to receive any mobile telecommunication standards, as opposed to having several receive chains in parallel.

Before rejection of DC offset, in a second step 2), there is a reduction of the noise factor for each component I&Q of a signal SEQ via a fixed gain amplifier AGCF. Said gain amplifier AGCF permits to adapt the impedances between the multipliers M1&M2 and the following adders ADD1&ADD2.

In a third step 3), a summing of all the spread received signal is performed via the adders ADD1&ADD2. In theory, the first adder ADD1 sums all the I components of all the received signals SEQ together, and the second adder ADD2 sums all the Q components of all the received signals SEQ together.

In practice, as we are in compressed mode operation, the adders ADD1&ADD2 have the same function as a multiplexer that directs the IS and QS components on the following stages LPF1-AGC and HPF1.

In a fourth step 4), rejection of the DC offset that remains on said spread carrier frequency spectrums is achieved via a simple DC compensation loop which behaves like a second order high pass filter of programmable high pass cut-off frequency. This high pass filters HPF1 (one for each component IS and QS of a signal SEQS) are cascaded with channel filters LPF1, which in this application are used solely to remove any spurs or far adjacent carrier frequencies which would be present despite the use of the sharp low-pass filter LPF3. The channel filters LPF1 can be a $5^{th}$ order Legendre low-pass filter and have a 3 dB cut-off frequency of 2.2 MHz.

Note that the DC offset has two main origins. The first one is the self-mixing between the local oscillator LO and self-mixing of RF carrier frequency resulting from either LO or RF leakage at the front-end: DC is generated by the mixing of LO with itself, and the RF signal with itself. This is due to the limited amount of isolation between the LO and RF port inherent in an RF IC.

The second one is due to second-order intermodulation performance of the receiver, which generates undesirable spectral components at baseband and a strong DC component. This is due in particular to the mixers of the receiver, which are not linear and which introduce input intersection point of $2^{nd}$ order known as IIP2 phenomenon.

This phenomenon induces a DC fluctuation. When the DC offset varies, after the gain amplifiers AGC of the receiver, said DC offset will be amplified. It then implies a clipping of the received signal by the ADC converter, which is a big inconvenient as the initial received signal SEQ is not recovered correctly.

Figure 9:
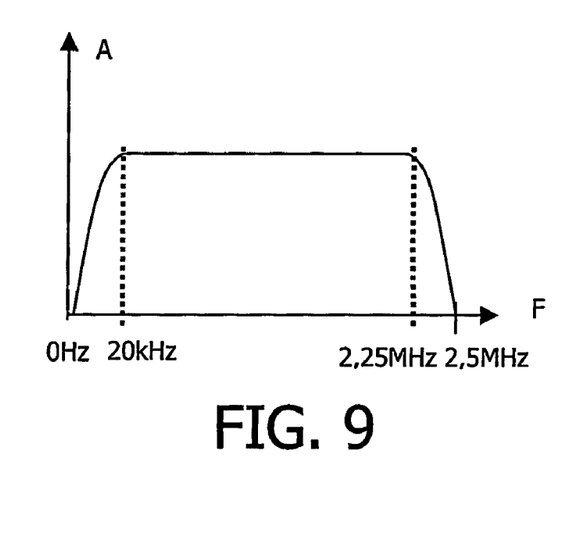
FIG. 9 illustrates a signal output by some first rejection of DC offsets means applied on a GSM signal of the receiver of FIG. 1 in the frequency domain.

The new spectrum of a signal SEQ in any mode after DC offset rejection is illustrated in FIG. 9. As can be seen, the DC offset has been filtered. The low frequency cut-off is now of 20 kHz, whereas the high frequency cut-off is of 2.25 MHz.

Note that both the low frequency cut-off and the high frequency cut-off are adjustable by programming. In fact, the resulting 3 dB bandwidth can vary from 1.9 to 2.2 MHz depending on the cut-off frequency of the analog filters HPF1 implemented in the RF chip.

Thus, this DC offset rejection has the advantage to be easy to implement. No complex components are needed. Moreover, only one DC compensation loop is needed for all the targeted loop, contrary to the state of the art, where there is a need of as many DC compensation loops as there are targeted modes.

Note that the spreading section SPREAD_SEC has the advantage to allow a good reconstruction of the received signal after DC offset rejection, contrary to a usual DC offset loop compensation. Indeed, in the GSM mode, for example, if one applies a DC offset loop compensation (a simple filter with a resistance and a capacitor) on the GSM signal which has a low bandwidth of 135 KHz, one issues a distort signal that is far away from the received signal. This is due to the cut-off frequency of 20 kHz of the DC offset loop compensation, which is too high for the GSM bandwidth. Indeed, if one applies a cut-off frequency of 20 kHz on a signal of a bandwidth of 130 kHz, it implies a destruction of said signal, whereas if one applies a cut-off frequency of 20 kHz on a signal of bandwidth of 2200 kHz, the impact is negligible.

Note that just after the channel filters LPF1, there is a control of the power of the signal SEQ. Said control permits to keep the power of the signal SEQ constant whatever the power of said signal SEQ is, which is necessary for the further analog to digital converter ADC element. Hence, via the unique amplifier gain controller AGC (in fact one for each IS&QS component), when the power of the signal decreases, for example when the mobile phone is far from the base station, the power is increased again and vice and versa.

Note that, in a preferred non-limitative embodiment, there are two cascades of rejection means HPF1 and low-pass filter LPF1 with an associated gain control amplifier AGC, for each component IS and QS of the spread signal SEQS. It gives a better filtering of the DC offset.

In a fifth step 5), once the DC offset has been rejected via HPF1 means, ADC sampling is performed. The I and Q-components of a spread signal SEQ require an adequate analog-to-digital converter ADC to sample the 2.2 MHz wide (3 dB bandwidth) analog signal SEQ in any mode. Sampling is performed with a 4×chip rate clock.

Note that there is only a single analog-to-digital converter ADC (in reality one ADC for each I&Q components) for all the targeted modes since all waveforms are similar in nature, i.e. spread spectrum signal occupying 3.84 MHz filtered by the filter LPF3 and the filters HPF1 and LPF1 of the channel filtering section.

In a sixth step 6), after ADC sampling, there is a despreading of the spread signals SEQ in order to recover the initial received signals SEQ. This despreading is achieved in the baseband chip BB_INT of FIG. 4 by means of the despreading means DSPR.

The spread section SPREAD_SEC as described above can send the despreading sequence PN used. Since the incoming signal is no longer a binary stream, but an analog waveform, this sequence PN must be acquired by the baseband chip BB_INT via an additional analog-to-digital converter ADC_PN.

Note that in a non-limitative embodiment, in order to ensure optimum matching of the sequence PN at the despreading section, the PN code used for spreading within the RF chip can be filtered with a low-pass filter stage identical to that used in the channel filtering section.

The despreading process consists in a measure of similarity between the spread signal SEQ and the despreading sequence PN. The correlator of the despreading means DSPR permits such a measure. This measure is performed by multiplying the signal and the sequence and summing (integration) the results over a defined time window, here over a bit period. The summing is done after a data decision on the multiplication results leading to a value of, for example, −1, +1.

Note that the despreading sequence PN is split and applied to one multiplier for each I&Q components of the signal SEQ, as shown in FIG. 4.

It can be noted that there is a time propagation of the spread signal SEQ when it is transmitted from the spreading section to the despreading section, said time propagation usually varying from one RF chip to a Baseband chip, depending on the components used between those two parts, especially depending on the low-pass filters.

Therefore, in order to improve the correlation process and to take this time propagation or delay into account, in a preferred embodiment, a synchronization between the despreading sequence PN and the spread signal SEQ via synchronization means SYNC is performed.

The synchronization means SYNC comprise a digital delay line DELAY producing a sliding clock S_CLK at 15,36 MHz, and a threshold value TH. The despreading sequence PN is fed through the digital delay line DELAY clocked at 4*the chip rate via the clock S_CLK, which results in a ¼ chip delay resolution. The despreading sequence PN can then be shifted in ¼ chip steps. The shifting, i.e. the despreading sequence PN phase is incremented by ¼ chip, is applied until the despreading sequence PN is synchronized or time-aligned or in phase with the spread signal SEQ, i.e. an optimum correlation peak is obtained. The maximum number of shifts is equal to the length LGH of the despreading sequence PN.

When such a synchronization is reached, the sliding clock S_CLK is stopped. No other tracking loop for synchronization is needed.

In detailed manner, at each ¼ chip shift, the correlation process is performed via the integration and dump means I&D to reconstruct the received signal SEQ in baseband.

During the dump, one looks at the result of the multiplication between each chip of the despreading sequence PN and the corresponding chip of the spread sequence SEQ.

Then, integration is performed on the data decision results by the integration and dump means I&D. If this integration is greater than the threshold value TH, for example 4, both signal SEQ and despreading sequence PN are described as synchronized, an optimum peak correlation PEAK is obtained. The result value is +1.

If no optimum correlation peak is obtained (the result value is −1), the sequence PN is shifted from ¼ chip and the correlation process described above is performed again and so on until an optimum peak is obtained.

Note that just after the delay line DELAY, the despreading sequence PN is then fed through the matching filter IIR, as shown in FIG. 4. By doing so, the despreading sequence PN suffers exactly the same amount of amplitude and phase distortion as the spread signal SEQ, which is necessary to have a good matching of the spread signal and the despreading sequence. Hence, since both modulated chips and despreading sequence look the same in both time and frequency domain, the correlation product is optimal and ensures an optimal signal-to-noise ratio SNR.

Note that for a UMTS signal, no despreading is done in the baseband chip BB_INT. Indeed, such a despreading will be done in a conventional UMTS receiver chip later on.

It may be observed that the synchronization described above has the advantage of having a well-known time propagation or delay of the spread signal SEQ and is unlikely to vary in time since the signal path consists of electrical transmission lines through a cascade of AGC amplifiers and low-pass filters in the RF chip and Baseband chip. Therefore, the architecture of the receiver according to the invention as described above, is obviously advantageous compared to a solution where the spreading section would be in the base station and the despreading section in the mobile phone.

Thus once time-aligned, no additional timing adjustments are required and no tracking loop is needed, as before, to maintain the alignment of the despreading sequence PN as opposed to some conventional wireless transceivers known as DSSS systems, where such a tracking loop is necessary due to the nature of the ether through which the carrier of the received signal SEQ is transmitted then received: multipath fading, shadowing and other propagation effects contribute to not only constantly rotating the phase of the carrier but also in variable propagation delays.

As no tracking loop is needed (once correct timing is reached, the timing delay will not vary due to the nature of transmission line between the spreading section and the despreading section) in the receiver according to the invention, this considerably simplifies the despreading section and results in two possible despreading implementations. The first one is a digital despreading within the baseband chip BB_INT as stated above and the second one is an analog despreading in the RF chip. In this later case, the rejection of the adjacent carrier frequencies of a signal SEQ is done via the integration and dump means I&D, and the despreading means must comprise a gain amplifier at the output of the filter IIR in order to adjust the amplitude of the despreading sequence PN with the power of the signal received from the mixers M1 and M2. To this end, on each branch of the component I and Q of a received signal SEQ, there is an automatic control loop just after the amplifiers AGC1, to detect the power of the received signal SEQ.

In a seventh step 7), after the correlation process, further rejection is achieved via the channel coefficient bank FIR associated to each targeted mode for rejecting adjacent carrier frequencies that could remain on the spectrum of the despread signal SEQ and which are close to the carrier frequency F0. Depending on the mode of the processed signal SEQ, a series of multiplexers applies the right coefficient to the associated low-pass filter BB_LPF. For the GSM mode, the coefficient is the cut-off frequency of 130 kHz, whereas for the Bluetooth mode, the coefficient is the cut-off frequency of 300 kHz, and for the UMTS mode, the cut-off frequency is of 3.84 MHz with a roll-off factor of $\alpha=0.22$ (there is a 22% reduction of the bandwidth°.

Figure 10:
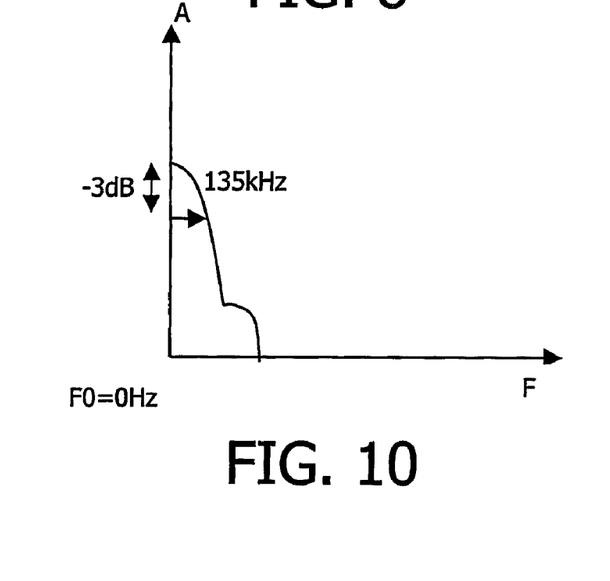
FIG. 10 shows a GSM signal recovered at the output of the receiver of FIG. 1.

Finally, the result of the despreading is that the bandwidth of a received signal SEQ has been compressed from 3.84 Mchip/sec to 135 kHz for a GSM signal. Hence, after the correlation process, the initial received signal SEQ is recovered as shown in FIG. 0 for a GSM signal.

Finally, at the filter output BB_LPF, the resulting I&Q components can then be passed over to the rest of the receiver chain RX_CHAIN to achieve in particular:
  demodulation via demodulation means DEMOD of the signal SEQ thus obtained, said demodulation permitting the user of the mobile to listen to a message on the headphone for example, and
  for a UMTS signal, descrambling and despreading via a conventional UMTS receiver chip UMTS_CHIP.

Hence, the receiver according to the invention has the advantage of resolving the problems of DC offset loop compensation on narrowband signals by using techniques used for wideband signals leading to a simple solution with low power consumption.

Moreover, the receiver according to the invention minimizes the duplication of RF blocks and allows multimode reception to be integrated into a single chip with no complex components.

It is to be understood that the present invention is not limited to the aforementioned embodiments and variations and modifications may be made without departing from the spirit and scope of the invention as defined in the appended claims. In the respect, the following closing remarks are made.

It is to be understood that the present invention can also be applied for any multimode receivers where DC offset rejection is needed.

It is to be understood that the method according to the present invention is not limited to the aforementioned implementation.

There are numerous ways of implementing functions of the method according to the invention by means of items of hardware or software, or both, provided that a single item of hardware or software can carry out several functions. It does not exclude that an assembly of items of hardware or software or both carry out a function, thus forming a single function without modifying the method for processing a signal in accordance with the invention.

Said hardware or software items can be implemented in several manners, such as by means of wired electronic circuits or by means of an integrated circuit that is suitably programmed, respectively.

Any reference sign in the following claims should not be construed as limiting the claim. It will be obvious that the use of the verb "to comprise" and its conjugations does not exclude the presence of any other steps or elements besides those defined in any claim. The article "a" or "an" preceding an element or step does not exclude the presence of a plurality of such elements or steps.

The invention claimed is:

1. A receiver for processing a received signal, said receiver being multimode, comprising: a single RF chip for processing the received signal in any mode, said chip comprising a spreading section for spreading and down-converting to baseband the received signal and a channel filtering section for DC offsets rejection on the received signal, and a single baseband chip comprising despreading means for despreading a spread signal, wherein the baseband chip further comprises channel filter coefficient banks with associated filters for each mode for rejecting adjacent carrier frequencies on the associated spread received signal, and a matching filter for producing the same distortion of a spread signal on a corresponding despreading sequence.

2. The receiver as claimed in claim 1, wherein the spreading section is adapted to produce a spread spectrum oscillator signal and a spreading sequence, in order to expand the bandwidth of a received signal.

3. The receiver as claimed in claim 1, wherein the spreading section further comprises unique rejection means for all the modes for suppressing the adjacent carrier frequencies of the associated received signals.

4. The receiver as claimed in claim 1, wherein the channel filtering section is common for all the modes.

5. The receiver as claimed in claim 1, wherein the channel filtering section comprises: a block of low-noise amplifier and associated mixers for each mode, and unique first rejection means for rejecting DC offsets on a spread received signal for any mode.

6. The receiver as claimed in claim 5, wherein the channel filtering section further comprises adding means for redirecting a spread received signal coming from a block of low-noise amplifier and associated mixers to the first rejection means.

7. The receiver as claimed in claim 1, wherein the despreading means comprise: a single multiplier, and a single correlator with integration and dump means.

8. The receiver as claimed in claim 1, wherein the baseband chip further comprises synchronization means for synchronizing a spread signal with a corresponding despreading sequence.

9. A mobile phone comprising a receiver as claimed in claim 1.

10. A method for receiving a signal in any mode, comprising:
spreading and down-converting the received signal to baseband, rejecting the DC offsets on the received signal using a single RF chip, and despreading the spread signal, using a single baseband chip, wherein the baseband chip further comprises channel filter coefficient banks with associated filters for each mode for rejecting adjacent carrier frequencies on the associated spread received signal, and a matching filter for producing the same distortion of a spread signal on a corresponding despreading sequence.

11. The method for receiving a signal as claimed in claim 10, further comprising producing a spread spectrum oscillator signal and a spreading sequence in order to expand the bandwidth of the received signal.

12. A receiver for processing a received signal, said receiver being multimode, comprising: a single RF chip for processing the received signal in any mode, said chip comprising a spreading section for spreading and down-converting to baseband the received signal and a channel filtering section for DC offsets rejection on the received signal, and a single baseband chip comprising despreading means for despreading a spread signal, wherein the channel filtering section comprises a block of low-noise amplifier and associated mixers for each mode, and unique first rejection means for rejecting DC offsets on a spread received signal for any mode, as well as adding means for redirecting a spread received signal coming from the block of low-noise amplifier and associated mixers to the first rejection means.

13. The receiver as claimed in claim 12, wherein the spreading section is adapted to produce a spread spectrum oscillator signal and a spreading sequence, in order to expand the bandwidth of a received signal.

14. The receiver as claimed in claim 12, wherein the spreading section further comprises unique rejection means for all the modes for suppressing the adjacent carrier frequencies of the associated received signals.

15. The receiver as claimed in claim 12, wherein the channel filtering section is common for all the modes.

16. The receiver as claimed in claim 12, wherein the baseband chip further comprises: channel filter coefficient banks with associated filters for each mode for rejecting adjacent carrier frequencies on the associated spread received signal, and a matching filter for producing the same distortion of a spread signal on a corresponding despreading sequence.

17. The receiver as claimed in claim 12, wherein the despreading means comprise: a single multiplier, and a single correlator with integration and dump means.

18. The receiver as claimed in claim 12, wherein the baseband chip further comprises synchronization means for synchronizing a spread signal with a corresponding despreading sequence.

19. A mobile phone comprising a receiver as claimed in claim 12.

* * * * *